United States Patent [19]

Guo

[11] Patent Number: 5,516,748
[45] Date of Patent: May 14, 1996

[54] METHODS FOR IMPROVING THE WETTING OF AGROCHEMICAL PARTICULATES WITH ZINC CHLORIDE

[75] Inventor: Yili Guo, Maple Glen, Pa.

[73] Assignee: Rohm and Haas Company, Philadelphia, Pa.

[21] Appl. No.: 420,393

[22] Filed: Apr. 12, 1995

Related U.S. Application Data

[63] Continuation of Ser. No. 33,997, Mar. 19, 1993, abandoned, which is a continuation-in-part of Ser. No. 877,332, May 1, 1992, abandoned.

[51] Int. Cl.$^6$ ............ A01N 25/02; A01N 25/14; A01N 37/22; A01N 47/14
[52] U.S. Cl. ............ 504/116; 514/476; 514/492; 514/494; 514/769; 71/DIG. 1; 424/489
[58] Field of Search .................. 514/476, 492, 514/494, 769; 504/116; 424/489; 71/DIG. 1

[56] References Cited

U.S. PATENT DOCUMENTS

| | | | |
|---|---|---|---|
| 3,737,551 | 6/1973 | Karsten et al. | 424/286 |
| 3,869,273 | 3/1975 | Noveroske | 71/77 |
| 3,869,486 | 3/1975 | Van den Boogaart et al. | 260/429 |
| 3,992,548 | 11/1976 | Pommer et al. | 424/274 |
| 4,299,613 | 11/1981 | Cardarelli | 71/27 |
| 4,584,309 | 4/1986 | Ishiguri et al. | 514/383 |
| 4,936,901 | 6/1990 | Surgant, Sr. et al. | 71/92 |
| 5,001,150 | 3/1991 | Yap | 514/476 |

FOREIGN PATENT DOCUMENTS

| | | |
|---|---|---|
| 56/133202 | 3/1980 | Japan. |
| 1427243 | 3/1976 | United Kingdom. |

*Primary Examiner*—S. Mark Clardy
*Attorney, Agent, or Firm*—Joseph F. Leightner

[57] ABSTRACT

New and improved compositions comprising particulates and an effective amount of one or more effective salt(s) to reduce significantly the wetting time and/or the dispersion time of said particulates relative to said time(s) in the absence of said salt(s) have been discovered. Methods for reducing the wetting time of particulates in liquid have also been discovered.

4 Claims, No Drawings

METHODS FOR IMPROVING THE WETTING OF AGROCHEMICAL PARTICULATES WITH ZINC CHLORIDE

This application is a continuation of application Ser. No. 08/033,997, filed Mar. 19, 1993, which is now abandoned.

BACKGROUND

Compositions containing particulates are often admixed with liquid compositions for application purposes. This broad operation includes mixing of powders in the household to making medical solutions to other applications such as on-site preparation of solutions in industrial or agricultural applications. Examples, without limitations, range from mixing flour with water in baking to making herbicidal or fungicidal agricultural compositions for field spraying or other distributing methods. One parameter of such operations is the time that it takes for the particulates to become wetted (i.e. "wetting time" or "wet-out time") to permit dispersion or dissolution of the particulates in a liquid application medium. "Wetting time" or "wet-out time" can be designated as the time for a known weight of solids poured on top of water in a container to completely submerge below the surface of the water. The wetting time can have a major impact on the time of operations, delays associate therewith, the degree of completion of dissolution or dispersion and the effectiveness of the applied composition as a result of incomplete dissolution or dispersion.

There continues to be a need for new and/or improved compositions or methods to improve the wetting time of particulates.

SUMMARY OF THE INVENTION

New and improved compositions comprising particulates and an effective amount of one or more salt(s) to increase the penetration rate of liquid into the particulates relative to the rate of penetration in the absence of said salt(s) have been discovered. Preferably, the increase in the rate of penetration results in reducing the wetting time and/or the dispersion time of said particulates in liquids. Methods for reducing the wetting time of particulates in liquids have also been discovered.

EMBODIMENTS OF THE INVENTION

An embodiment of the present invention is a composition comprising particulates and an effective amount of one or more ammonium salt(s), boron salt(s), and/or effective metal salt(s) to increase the penetration rate of liquid into the particulates relative to the rate of penetration in the absence of said salt(s).

In a preferred embodiment the present invention is a composition comprising particulates and an effective amount of one or more ammonium salt(s), boron salt(s), and/or effective metal salt(s) to reduce significantly the wetting time and/or the dispersion time of said particulates in liquid relative to said time(s) in the absence of said salt(s).

The particulates and liquid in the invention can be any usable combination of particulates and liquid for an intended utility. For example, the particulates could be commercial foodstuff, e.g. powdered milk, flour etc., and the liquid can be water or water-containing solutions (e.g. milk). Other combinations include agricultural utilities, such as in-field formulations of agrochemicals, e.g. herbicides etc., and water. It is not intended that the present invention is limited to water as the liquid by these examples.

The effective salts usable in the invention preferably comprise ammonium or boron, or one or more metals selected from zinc, manganese, copper, iron, cobalt, aluminum, magnesium, calcium, strontium, sodium, barium, tin, lead, silver, nickel, and potassium. Such ammonium, boron or metal moieties are alternatively referred to as the cation of the salt. The anionic portion of the salt is preferably a moiety such that the one or more salt(s) has an anion portion which is $SO_4^{-2}$, $Cl^{-1}$, $Br^{-1}$, $I^{-1}$, $C_2H_3O_2^{-1}$, $CO_3^{-2}$, $NO_3^{-1}$, $OH^{-1}$, $S^{-2}$, $PO_4^{-3}$, $AlO_2^{-1}$, $AsO_3^{-3}$, $HAsO_3^{-2}$, $H_2AsO_3^{-}$, $_1AsO_4^{-3}$, $HAsO_4^{-2}$, $H_2AsO_4^{-1}$, $B_4O_7^{-2}$, $CN^{-1}$, $PO_3^{-3}$, $HPO_3^{-3}$, $H_2PO_3^{-1}$, $HPO_4^{-2}$, $H_2PO_4^{-1}$, $P_2O_7^{-4}$, $S_2O_6^{-2}$, $CHO_2^{-1}$, $SO_3^{-2}$ or a mixture thereof.

The amount of salt used is that amount which is effective to increase the penetration rate of liquid into the particulate, preferably a significant amount of increase. For example, the increase in penetration rate is such that the wet-out time is about thirty percent less, more preferably about fifty percent less, even more preferably about seventy-five percent less, than that without the effective salts. The weight amount of the salt can range preferably from about 0.1 to about 50 weight percent, more preferably from about 0.1 to about 10 weight percent, even more preferably from about 0.1 to about 6 weight percent, of the total composition weight. In one preferred embodied composition the amount of effective salt in the composition is in a weight percent of from about 0.1 percent to about 6 percent and the wet-out time of the composition is less than about fifty percent of the wet-out time of a comparable composition having an absence of said salt.

The particular form or nature of the salt can vary and still provide the benefits of the present invention. For instance, the one or more salt(s) can comprise a multiple salt complex. That is, it can be a complex of two or more different salts. For example, a multiple salt complex can be represented by the formula $2NaCl \cdot CaCl_2$ or $K_2CO_3 \cdot Na_2CO_3$. Embodied multiple salt complexes can be hydrated, such as $ZnCl_2 \cdot 3ZnO \cdot 5H_2O$ for example.

Embodiment of the invention can comprise other forms of salt. For instance, the one or more salt(s) can comprise a hydrated salt. For example, the hydrated salt can be $CuSO_4 \cdot H_2O$. The ratio of salt molecules to water molecules need not be one to one.

The salt need not consist of only one cation in the salt compound. Accordingly, embodied compositions can comprise a multiple cation salt. One example of a multiple salt is $K_2Zn(SO_4)_2$. Similarly, the anionic portion can have multiple anions.

One embodiment of the present invention is wherein the one or more salt(s) comprise a melted salt. A mixture of salts can be melted together for the melted salt. Examples are $2NaCl \cdot CaCl_2$, $Na_2SO_4 \cdot MgSO_4$, and $2NaCl \cdot SrCl_2$.

Without limiting the scope of the present invention, the following salts are representative of salts useable:

| | | | |
|---|---|---|---|
| $Zn(C_2H_3O_2)_2 \cdot H_2O$ | $Zn(C_2H_3O_2)_2 \cdot 2H_2O$ | $Zn(C_2H_3O)_2$ | $CuCl_2$ |
| $CuSO_4$ | $Cu(NO_3)_2$ | $MnCl_2 \cdot 4H_2O$ | $MnCl_2$ |
| $MnCl_2 \cdot 2H_2O$ | $ZnSO_4$ | $ZnSO_4 \cdot H_2O$ | $MnSO_4$ |
| $CuCl_2 \cdot 2H_2O$ | $CuSO_4 \cdot H_2O$ | $ZnBr_2$ | $ZnI_2$ |

-continued

| | | | |
|---|---|---|---|
| $MnSO_4.H_2O$ | $Mn(NO_3)_2$ | $Mn(CHO_2)_2$ | $FeCl_2$ |
| $Mn(C_2H_3O_2)_2$ | $FeCl_3$ | $FeCl_2.2H_2O$ | $FeCl_2.4H_2O$ |
| $FeCl_3.2.5H_2O$ | $FeCl_3.6H_2O$ | $FeSO_4$ | $FeSO_4.H_2O$ |
| $FeSO_4.4H_2O$ | $CoCl_2$ | $CoBr_2$ | $BBr_3$ |
| $CoCl_2.2H_2O$ | $AlCl_3$ | $AlCl_3.6H_2O$ | $AlBr_3$ |
| $AlI_3$ | $Al_2S_3$ | $AlCl_3.SO_2$ | $AlCl_3.5SO_2$ |
| $AlCl_3.5H_2S$ | $Al_2(SO_4)_3.6H_2O$ | $Al_2(SO_4)_3.18H_2O$ | $AlCl_3.NH_3$ |
| $AlCl_3.3NH_3$ | $AlCl_3.NH_4Cl$ | $AlCl_3.5NH_3$ | $AlCl_3.6NH_3$ |
| $AlCl_3.9NH_3$ | $AlCl_3.3/4ZnCl_2$ | $AlCl_3.AgCl$ | $MgCl_2$ |
| $MgCl_2.2H_2O$ | $MgCl_2.4H_2O$ | $MgCl_2.6H_2O$ | $MgBr_2$ |
| $MgSO_4$ | $MgSO_4.H_2O$ | $MgSO_4.2H_2O$ | $CaCl_2$ |
| $CaCl_2.H_2O$ | $CaCl_2.2H_2O$ | $Ca(NO_3)_2$ | $CaBr_2$ |
| $Ca(C_2H_3O_2)_2.H_2O$ | $CaI_2$ | $CaSO_4$ | $MgI_2$ |
| $MgSO_4.4H_2O$ | $SrO$ | $SrCl_2$ | $SrBr_2$ |
| $SrBr_2.H_2O$ | $SrBr_2.2H_2O$ | $Na_2O$ | $NaOH$ |
| $NaOH.1/2H_2O$ | $NaOH.H_2O$ | $Na_2S$ | $NaHS_2$ |
| $Na_2Se$ | $NaPO_3$ | $Na_2P_2Cl_7$ | $Na_2HPO_3$ |
| $Na_2HPO_4$ | $Na_3HP_2O_7$ | $Na_2CO_3$ | $NaCl.AlCl_3$ |
| $3NaCl.2AlCl_3$ | $KOH$ | $K_2CO_3.Na_2CO_3$ | $ZnCl_2$ |
| $K_2CO_3.2NaCO_3$ | $K_2CO_3.3Na_2CO_3$ | $K_2CO_3.4Na_2CO_3$ | $K_2S$ |
| $2K_2CO_3.Na_2CO_3$ | $3K_2CO_3.Na_2CO_3$ | $K_2CO_3.1/2H_2O$ | $KC_2H_3O_2$ |
| $K_2Zn(SO_4)_2$ | $KCl.AlCl_3$ | $2KCN.Zn(CN)_2$ | $KCl.MgCl_2$ |
| $K_2SO_4.CuSO_4$ | $3KCl.2AlCl_3$ | $3KCl.AlCl_3$ | $2KCl.MgCl_2$ |
| $Mn(C_2H_3O_2)_2.4H_2O$ | $4KClMgCl_2$ | $K_2Mg(SO_4)_2$ | $2KCl.CaCl_2$ |
| Melted salt mixtures: | $Na_2SO_4.MgSO_4$ | $2NaCl.CaCl_2$ | $2NaCl.SrCl_2$ |

Other embodiments include compositions wherein the solid particulates comprise one or more dithiocarbamate compound(s). In one embodiment there is preferred one or more dithiocarbamate compound(s) which are selected from ethylenebisdithiocarbamate metal salts, dimethyldithiocarbamate metal salts, propylenebisdithiocarbamate metal salts, and/or metiram-complex. Metiram-complex can be named as tris [ammine-[ethylen bis (dithiocarbamato)]zinc (II)] [tetrahydro-1,2,4,7-dithiadiazocine-3,8-dithione] polymer. In another embodiment, thiram [e.g. bis (dimethylthiocarbamoyl) disulfide can be used in place of the dithiocarbamate compound. A preferred ethylenebisdithiocarbamate metal salt comprises zinc chloride. Also preferred are compositions wherein the solid particulates comprise N-(3,4-dichlorophenyl)propionamide (propanil). Such compositions can have applications in agricultural operations.

Embodied compositions can additionally comprise a surface active agent in an amount up to about twenty (20) weight percent of the total composition weight, preferably from about 0.1 percent to about 15 percent, more preferably from about 1 percent to about 10 percent. Preferred surface active agents are, but are not limited to, a group consisting of WAFEX™ dispersant; IGEPAL™ CA720, IGEPAL™ DM970 surfactant, available from the Rhone-Poulenc Company; BORRESPERSE™ NA ligosulfonate available from Ligno Tech Inc.; AEROSOL™ OT-70 PG surfactant available from American Cyanamid. SURFYNOL™ 104S surfactant available from Air Products and Chemical Company.

Also embodied are methods for wetting solid particulates in a liquid comprising admixing the solid particulates with one or more embodied salt(s) prior to, comtemporaneous with, or after adding the solid particulates to a liquid for wetting, dissolution or dispersion. Such methods can include simple admixing steps or milling of the solid particulates with the one or more embodied salt(s) so as to adfix or adhere the salt to the surface of the solid particulate.

The following examples are intended to illustrate but not limit the scope of the embodied invention.

EXPERIMENT 1

A comparison of wetting time was made between regular baking flour without zinc chloride and with zinc chloride. The samples of flour with zinc chloride were prepared by first admixing the flour and zinc chloride powder (98%, A.C.S. reagent, Aldrich Chemical Company, Inc.) before addition to 100 ml of tap water for timing to wet-out condition. No stirring was performed after the addition of sample to the water. The following results were obtained:

| Sample No. | Flour Weight (grams) | $ZnCl_2$ Weight (grams) | Wet-Out Time (seconds) |
|---|---|---|---|
| 1 | 5.00 | 0.30 | 302 |
| 2 | 5.00 | 0.30 | 269 |
| 3 | 5.00 | 0.00 | 815 |
| 4 | 5.00 | 0.00 | 790 |

EXPERIMENT 2

A mancozeb powder was produced by spray-drying a slurry composed of the following components:

| Component | Weight Percent |
|---|---|
| Maneb Wet-cake* | 65.9 |
| $ZnSO_4.7H_2O$ | 3.8 |
| Hexamethylenetetramine Stabilizer | 1.1 |
| Reax ™ 100M Dispersant | 3.3 |
| Water | 25.9 |

*The wet cake prior to admixing is about 55% manganese ethylenebisdithiocarbamate.

The spray-dried mancozeb powder was separated into two samples, one sample being dry mixed with zinc chloride in a weight ratio of zinc chloride:mancozeb=2:100. Using procedures similar to Experiment 1, the following results were observed:

| Sample | Wet-out time (Minutes) |
|---|---|
| without $ZnCl_2$ | 12.0 |
| with $ZnCl_2$ | 3.5 |

EXPERIMENT 3

Samples of mancozeb powders which were spray-dried to a moisture content of about 6 to about 9 percent water by weight were produced from slurries comprising admixed 65.9 weight percent maneb wet-cake and 1.1 weight percent hexamethylenetetramine stabilizer as well as the following components in the reported weight percentages. The respective reported wet-out times were observed. Suspensibility of each sample was determined using the modified WHO method of admixing 2 grams of sample in 250 grams of water in a 250 milliliter cylinder, inverting thirty times and, after thirty minutes, collecting the bottom ten percent, which is then dried and weighed relative to the original 2 grams. The suspensibility for the samples ranged from about 60 to about 80 percent.

| Sample No | $ZnSO_4 \cdot 7H_2O$ | $ZnCl_2$ | Surface Active Agent* | Water | Wet-Out Time (secs) |
|---|---|---|---|---|---|
| 1[a] | 3.8 | 0.0 | 3.3[d] | 27.85 | 779 |
| 2 | 3.8 | 0.0 | 2.0[b] | 26.2 | 280 |
| 3 | 3.8 | 0.0 | 2.0[b] 0.5[c(3)] | 26.7 | 80 |
| 4 | 3.8 | 0.0 | 2.0[b] 0.5[c(1)] | 26.7 | 73 |
| 5 | 3.8 | 0.0 | 2.0[b] 0.5[c(2)] | 26.7 | 51 |
| 6 | 1.9 | 0.9 | 2.0[b] | 28.2 | 60 |
| 7[a] | 0.0 | 1.8 | 3.3[d] | 27.85 | 55 |
| 8[a] | 0.0 | 1.8 | 2.9[d] 0.63[e] | 26.62 | 28 |
| 9 | 0.0 | 1.8 | 2.9[d] 1[f] | 27.3 | 26 |
| 10 | 0.0 | 1.8 | 2.0[b] | 29.2 | 16 |

*Agents
[a]0.05 weight percent ANTIFOAM ™ C antifoaming agent [Corning] added to these samples
[b]WAFEX ™ dispersant
[c](1)Igepal ™ CA 720, (2)Igepal CO 630, and (3)Igepal DM 970 surfactants [Rhone Poulenc Company]
[d]BORRESPERSE ™ NA ligosulfonate [LignoTech Inc.]
[e]AEROSOL ™ OT-70PG surfactant [American Cyanamid]
[f]SURFYNOL ™ 104 S surfactant [Air Products & Chemicals Company].

What is claimed is:

1. A method for wetting of particulates comprising:

admixing a particulate material, wherein the particulate material is an agricultural chemical, with an effective amount of a metal salt consisting essentially of zinc chloride such that the particulate material is wetted, dissolved or dispersed in less than 50% of the time needed to wet, dissolve or disperse the particulate material in the absence of zinc chloride.

2. The method of claim 1 wherein the amount of zinc chloride is from about 0.1 to about 10% of the total weight of the particulate and zinc chloride mixture.

3. The method of claim 1 wherein the particulate is selected from the group consisting of propanil, thiram and dithiocarbamate compounds.

4. The method of claim 1 wherein the particulate is dithiocarbamate compounds.

* * * * *